US012700916B2

(12) United States Patent (10) Patent No.: US 12,700,916 B2
Ozozlu et al. (45) Date of Patent: Aug. 4, 2026

(54) METHOD FOR UPLINK/DOWNLINK CHANNEL BUNDLING FOR IMPROVED SPECTRUM ALLOCATION AND LINK BUDGET FOR PERFORMANCE MOBILE CELLULAR SATELLITE SYSTEMS

(71) Applicant: T-MOBILE INNOVATIONS LLC, Overland Park, KS (US)

(72) Inventors: Akin Ozozlu, McLean, VA (US); Nagi A. Mansour, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 354 days.

(21) Appl. No.: 18/206,769

(22) Filed: Jun. 7, 2023

(65) Prior Publication Data

US 2024/0413889 A1 Dec. 12, 2024

(51) Int. Cl.
| | |
|---|---|
| *H04B 7/185* | (2006.01) |
| *H04B 7/195* | (2006.01) |
| *H04L 5/14* | (2006.01) |
| *H04W 72/1268* | (2023.01) |

(52) U.S. Cl.
CPC ......... *H04B 7/18513* (2013.01); *H04B 7/195* (2013.01); *H04L 5/14* (2013.01); *H04W 72/1268* (2013.01)

(58) Field of Classification Search
CPC ......... H04W 72/1268; H04W 72/1273; H04W 72/1263; H04B 7/18513; H04B 7/1851; H04B 7/18517; H04B 7/195; H04B 7/18578; H04B 7/18576; H04L 5/14
See application file for complete search history.

(56) References Cited

U.S. PATENT DOCUMENTS

| | | | | |
|---|---|---|---|---|
| 2017/0331577 A1* | 11/2017 | Parkvall | .............. | H04L 27/2602 |
| 2020/0053778 A1* | 2/2020 | Babaei | .................. | H04W 16/04 |
| 2020/0145934 A1* | 5/2020 | Wang | .................... | H04L 5/0094 |
| 2022/0006603 A1* | 1/2022 | Lei | ........................ | H04W 80/02 |
| 2022/0029695 A1* | 1/2022 | Lekutai | ................. | H04L 5/1469 |
| 2022/0377760 A1* | 11/2022 | Sun | ..................... | H04W 72/543 |
| 2023/0292311 A1* | 9/2023 | Cao | ....................... | H04L 5/0091 |
| 2024/0014888 A1* | 1/2024 | Wang | ................. | H04B 7/18563 |
| 2024/0048341 A1* | 2/2024 | Uchino | ................. | H04L 5/1469 |
| 2024/0413889 A1* | 12/2024 | Ozozlu | ..................... | H04L 5/14 |

FOREIGN PATENT DOCUMENTS

| | | | | |
|---|---|---|---|---|
| CN | 114172529 A | * | 3/2022 | ........... H04B 7/2615 |

* cited by examiner

*Primary Examiner* — Phong La
(74) *Attorney, Agent, or Firm* — Shook, Hardy & Bacon L.L.P.

(57) ABSTRACT
According to aspects herein, methods and systems for providing multiple channel bundling for mobile phone satellite cellular systems are provided. More particularly, after a node comprising at least one time division duplex (TDD) layer and a frequency division duplex (FDD) layer determines a user equipment (UE) supports dual bands, the node initiates bundling of downlink communications over the FDD layer and a portion of the TDD layer. Additionally, the node instructs the UE to communicate uplink communications over the FDD layer and not uplink slots of the TDD layer. In this way, link budget is improved because only low band (FDD) is utilized in uplink communications from the UE to the node. Moreover, additional bandwidth is provided in downlink communications from the node to the UE because low band is bundled with the downlink slots of mid band (TDD).

19 Claims, 6 Drawing Sheets

300

314

322 322 322 320 320 322 322 322 322 320

302

400

402 — DETERMINE, AT A NODE COMPRISING AT LEAST ONE TIME DIVISION DUPLEX (TDD) LAYER AND A FREQUENCY DIVISION DUPLEX (FDD) LAYER, A UE SUPPORTS DUAL BANDS

404 — INITIATE BUNDLING OF DOWNLINK COMMUNICATIONS, BY THE NODE, OVER THE FDD LAYER AND A PORTION OF THE TDD LAYER

406 — INSTRUCT THE UE TO COMMUNICATE UPLINK COMMUNICATIONS OVER THE FDD LAYER AND NOT UPLINK SLOTS OF THE TDD LAYER

500

502 — COMMUNICATE TO A NODE INDICATING A USER EQUIPMENT (UE) SUPPORTS UPLINK COMMUNICATIONS AND DOWNLINK COMMUNICATIONS OVER A TIME DIVISION DUPLEX (TDD) LAYER AND A FREQUENCY DIVISION DUPLEX (FDD) LAYER

504 — RECEIVE INSTRUCTIONS, FROM THE NODE, TO COMMUNICATE THE UPLINK COMMUNICATIONS OVER THE FDD LAYER AND NOT UPLINK SLOTS OF THE TDD LAYER

METHOD FOR UPLINK/DOWNLINK CHANNEL BUNDLING FOR IMPROVED SPECTRUM ALLOCATION AND LINK BUDGET FOR PERFORMANCE MOBILE CELLULAR SATELLITE SYSTEMS

SUMMARY

Embodiments of the technology described herein are directed to, among other things, systems and methods for providing multiple channel bundling for mobile phone satellite cellular systems. More particularly, after a node comprising at last one time division duplex (TDD) layer and a frequency division duplex (FDD) layer determines a user equipment (UE) supports dual bands, the node initiates bundling of downlink communications over the FDD layer and a portion of the TDD layer. Additionally, the node instructs the UE to communicate uplink communications over the FDD layer and not uplink slots of the TDD layer. In this way, link budget is improved because only low band (FDD) is utilized in uplink communications from the UE to the node.

Moreover, additional bandwidth is provided in downlink communications from the node to the UE because low band is bundled with the downlink slots of mid band (TDD).

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
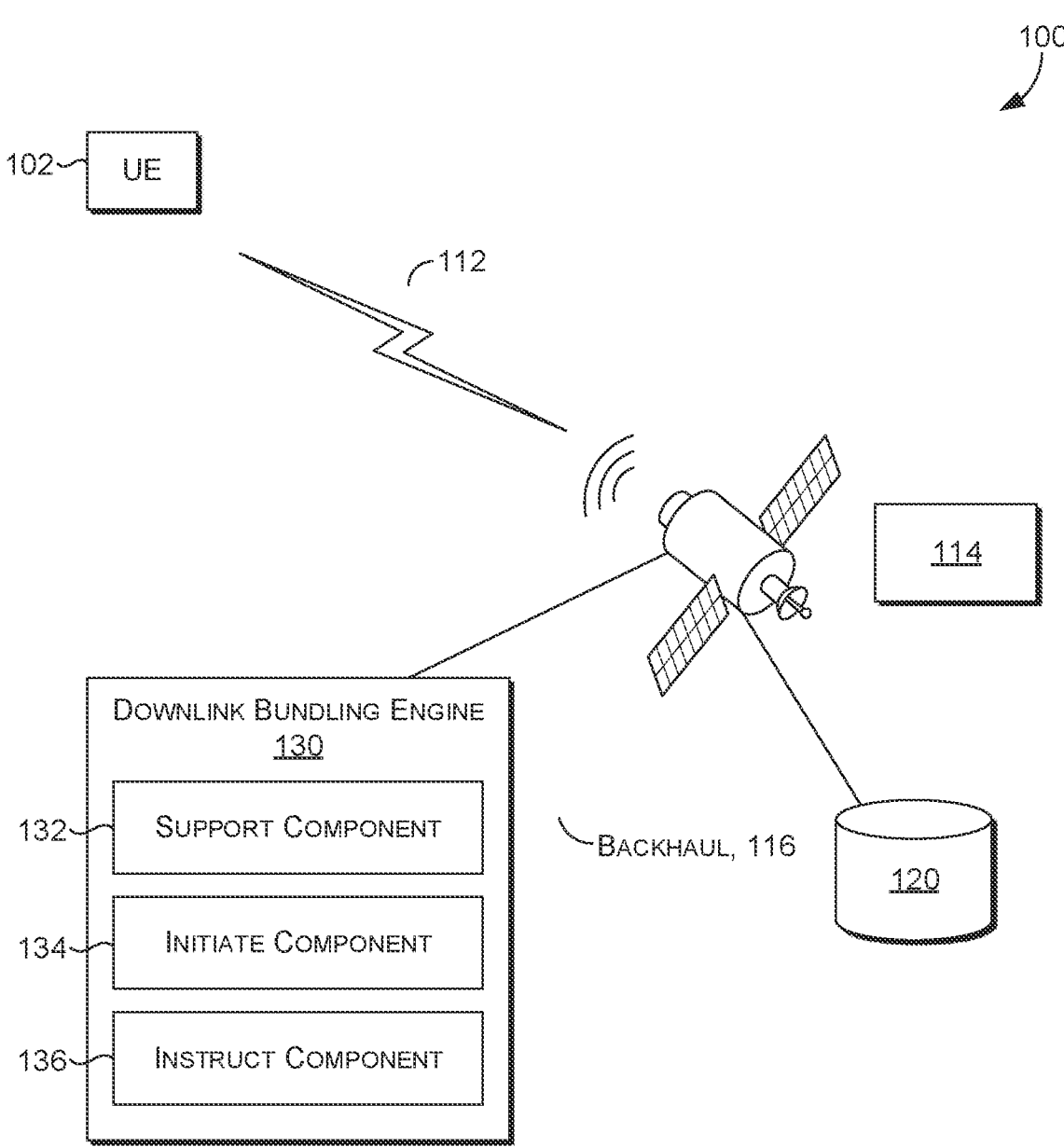
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BRS Broadband Radio Service
CD-ROM Compact Disk Read Only Memory
CDMA Code Division Multiple Access
EIRP Equivalent Isotropically Radiated Power
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit
NEXRAD Next-Generation Radar
NR New Radio
NSA Nonstandalone
OOBE Out-of-Band-Emission
PC Personal Computer
PCS Personal Communications Service
PDA Personal Digital Assistant
RAM Random Access Memory
RAT Radio Access Technology
RET Remote Electrical Tilt
RF Radio-Frequency
RFI Radio-Frequency Interference
R/N Relay Node
RNR Reverse Noise Rise
ROM Read Only Memory
RRU Remote Radio Unit
RSRP Reference Signal Received Power
RSRQ Reference Signal Received Quality
RSSI Received Signal Strength Indicator
SA Standalone
SINR Signal-to-Interference-Plus-Noise Ratio
SNR Signal-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point.

Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB or a New Radio (NR) connection). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

Carrier aggregation is a technique that allows an uplink or downlink transmission to occur over more than one frequency. As multiple frequency blocks are assigned to the same UE, the throughput is improved. Put another way, the uplink or downlink bandwidth available to the UE is increased. Carrier aggregation can be accomplished using an additional TDD layer or a FDD layer.

Low earth orbit (LEO) cellular satellite systems suffer from lack of spectrum since it is difficult to carve spectrum for these systems. Standard mobile phone antennas are generally blocked by users' hands which degrades mid band spectrum coverage five hundred kilometers away from earth. As the frequency increases, so does the over the air loss. Extremely low signal strength results, especially for uplink communications. Hybrid automatic repeat request (HRAQ) processes, latency, and the distance between UEs and LEO mobile cellular satellite systems prevent conventional systems from relying on sharing uplink and downlink communications over TDD. For example, because of the latency, uplink and downlink communications over TDD would collide. Accordingly, LEO mobile cellular satellite systems typically rely on uplink and downlink communications over FDD which limit the uplink and downlink bandwidth available to the UE.

The present disclosure is directed to systems, methods, and computer readable media for providing multiple channel bundling for mobile phone satellite cellular systems. More particularly, after a node comprising at last one TDD layer and a FDD layer determines a UE supports dual bands, the node initiates bundling of downlink communications over the FDD layer and a portion of the TDD layer. Additionally, the node instructs the UE to communicate uplink communications over the FDD layer and not uplink slots of the TDD layer. In this way, link budget is improved because only low band (FDD) is utilized in uplink communications from the UE to the node. Moreover, additional bandwidth is provided in downlink communications from the node to the UE because low band is bundled with the downlink slots of mid band (TDD).

According to aspects of the technology described herein, a method for providing uplink/downlink channel bundling in mobile cellular satellite systems is provided. The method comprises determining, at a node comprising at last one time division duplex (TDD) layer and a frequency division duplex (FDD) layer, a user equipment (UE) supports dual bands. The method also comprises initiating bundling of downlink communications, by the node, over the FDD layer and a portion of the TDD layer. The method further comprises instructing, by the node, the UE to communicate uplink communications over the FDD layer and not uplink slots of the TDD layer.

According to further aspects of the technology described herein, one or more computer-readable media having computer-executable instructions embodied thereon that, when executed by at least one computing device, cause the computing device to perform operations for providing uplink/ downlink channel bundling in mobile cellular satellite systems. The operations comprise communicating to a node indicating a user equipment (UE) supports uplink communications and downlink communications over a time division duplex (TDD) layer and a frequency division duplex (FDD) layer. The operations also comprise receiving instructions, from the node, to communicate the uplink communications over the FDD layer and not uplink slots of the TDD layer.

According to even further aspects of the technology described herein, a system for providing uplink/downlink channel bundling in mobile cellular satellite systems is provided. The system comprises a UE. The system also comprises a node comprising at last one time division duplex (TDD) layer and a frequency division duplex (FDD) layer and configured to wirelessly communicate with the UE. The node is configured to determine, a user equipment (UE) supports uplink communications and downlink communications over the TDD layer and the FDD layer. The node is also configured to initiate bundling of the downlink communications over the FDD layer and a portion of the TDD layer. The node is further configured to instruct the UE to communicate uplink communications over the FDD layer and not uplink slots of the TDD layer.

FIG. 1 depicts a wireless network environment incorporating a carrier aggregation system in which implementations of the present disclosure may be employed. Such a network environment is illustrated and designated generally as network environment 100. Network environment 100 is not to be interpreted as having any dependency or requirement relating to any one or combination of components illustrated.

Network environment 100 includes user equipment (UE) 102, access point 114 (which may be a cell site, base station, LEO mobile cellular satellite systems, or the like), and one or more communication channels 112. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device) that communicates via wireless communications with the access point 114 in order to interact with a public or private network.

Figure 6:
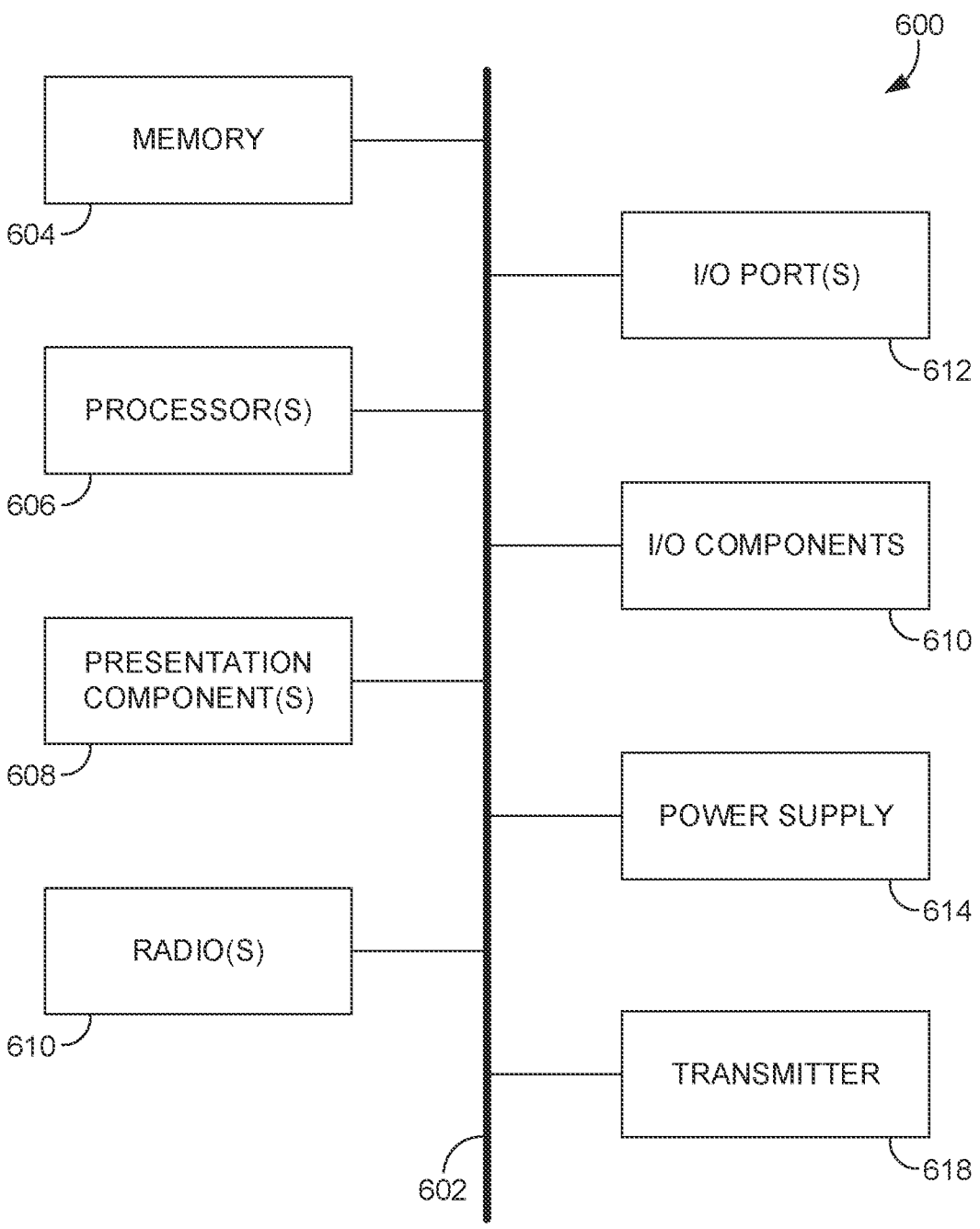
FIG. 6 depicts an example computing environment suitable for use in implementation of the present disclosure.

In some aspects, the UE 102 may correspond to computing device 600 in FIG. 6. Thus, a UE can include, for example, a display(s), a power source(s) (e.g., a battery), a data store(s), a speaker(s), memory, a buffer(s), a radio(s) and the like. In some implementations, for example, a UE 102 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UE 102 in network environment 100 can optionally utilize one or more communication channels 112 to communicate with other computing devices (e.g., a mobile device(s), a server(s), a personal computer(s), etc.) through access point 114. The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, NR, and the like) to user devices, such as UE 102. For example, the one or more communication channels may provide voice, SMS, and/or data services to UE 102, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 114 is configured to communicate with a UE, such as UE 102, that are located within the geographic area, or cell, covered by radio antennas of access point 114. An access point 114 may include one or more base stations, base transmitter stations, radios, antennas, antenna arrays, power amplifiers, transmitters/ receivers, digital signal processors, control electronics, GPS equipment, and the like. In particular, access point 114 may be an LEO mobile cellular satellite system.

As shown, access point 114 is in communication with downlink bundling engine 130 and at least a network database 120 via a backhaul channel 116. As the UE 102 communicates with the access point 114, access point 114 may collect and store data corresponding to capabilities of the UE 102 at a network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the data stored in the network database 120 current.

The downlink bundling engine 130 generally provides uplink/downlink channel bundling in mobile cellular satellite systems, in accordance with aspects herein. The downlink bundling engine 130 comprises a support component 132, an initiate component 134, and an instruct component 136. Although the downlink bundling engine 130 is shown as a single component comprising the support component 132, the initiate component 134, and the instruct component 136, it is also contemplated that each of the support component 132, the initiate component 134, and the instruct component 136 may reside at different locations, be its own separate entity, and the like, within the network carrier system, or as a component of UE 102.

The support component 132 generally determines the capabilities of the UE 102 based on communications with the UE 102. For example, the support component 132 may determine the UE 102 supports dual bands (i.e., a TDD layer and a FDD layer). The support component 132 may also determine the access point 114 (i.e., the node) comprises at least one time division duplex (TDD) layer and a frequency division duplex (FDD) layer. In aspects, the FDD layer is 600, 700, or 850 MHz. In other aspects, the FDD layer is 1900 MHz. In some aspects, the TDD layer is 2500 MHz.

The initiate component 134 generally initiates bundling of downlink communications over the FDD layer and a portion of the TDD layer. Accordingly, the node communicates downlink communications to the UE 102 over the FDD layer and the portion of the TDD layer (i.e., the downlink slots of the TDD layer).

The instruct component 136 generally instructs the UE to communicate uplink communications over the FDD layer and not uplink slots of the TDD layer. Put another way, the instruct component 136 instructs the UE to only communicate uplink communications over the FDD layer. Accordingly, uplink communications are received at the node over the FDD layer and not the TDD layer.

Figure 2:
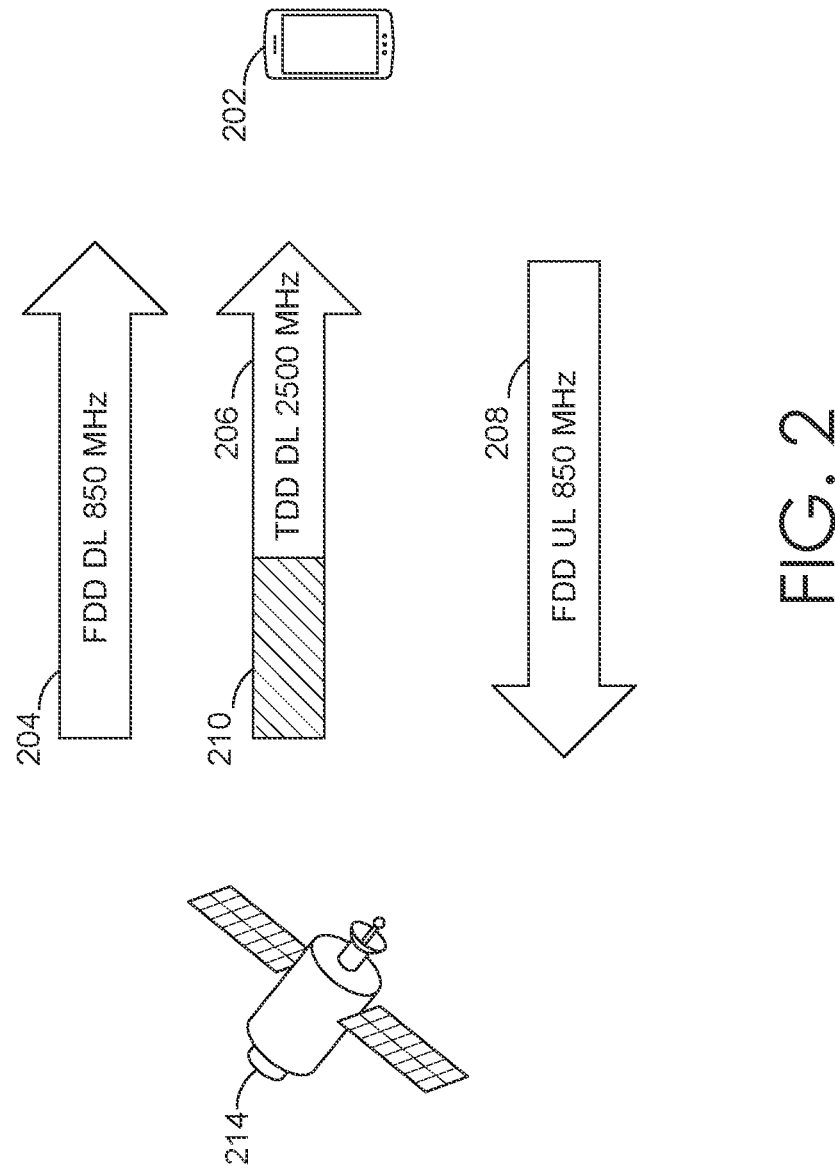
FIG. 2 depicts uplink and downlink communications flow in a mobile cellular satellite system, in accordance with aspects herein.

FIG. 2 illustrates depicts uplink and downlink communications flow in a mobile cellular satellite system, in accordance with aspects herein. As illustrated, UE 202 and LEO mobile cellular satellite system 214 comprising at least one TDD layer and a FDD layer are communicating over a TDD layer and an FDD layer. In particular, the LEO mobile cellular satellite system 214 is communicating downlink communications to the UE 202 over FDD downlink 850 MHz layer 204 and the downlink slots of TDD downlink 2500 MHz layer 206. The UE 202 is communicating uplink communications to the LEO mobile cellular satellite system 214 over FDD uplink 850 MHz 208. Importantly, the UE 202 is not communicating uplink communications to the LEO mobile cellular satellite system 214 over uplink slots of TDD uplink 2500 MHz 210.

Figure 3:
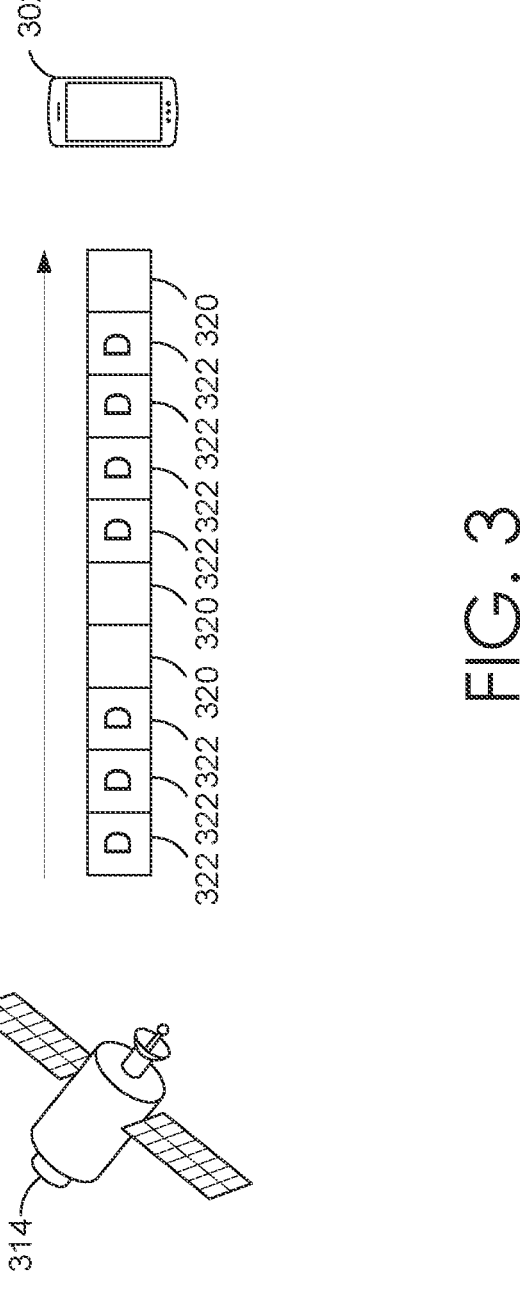
FIG. 3 depicts the TDD layer in a mobile cellular satellite system, in accordance with aspects herein.

Referring to FIG. 3, the TDD layer in a mobile cellular satellite system is illustrated, in accordance with aspects herein. As illustrated, UE 202 and LEO mobile cellular satellite system 214 comprising at least one TDD layer and a FDD layer are communicating downlink communications over downlink slots 322 of the TDD layer. However, the uplink slots 320 of the TDD layer are not utilized for uplink communications.

Figure 4:
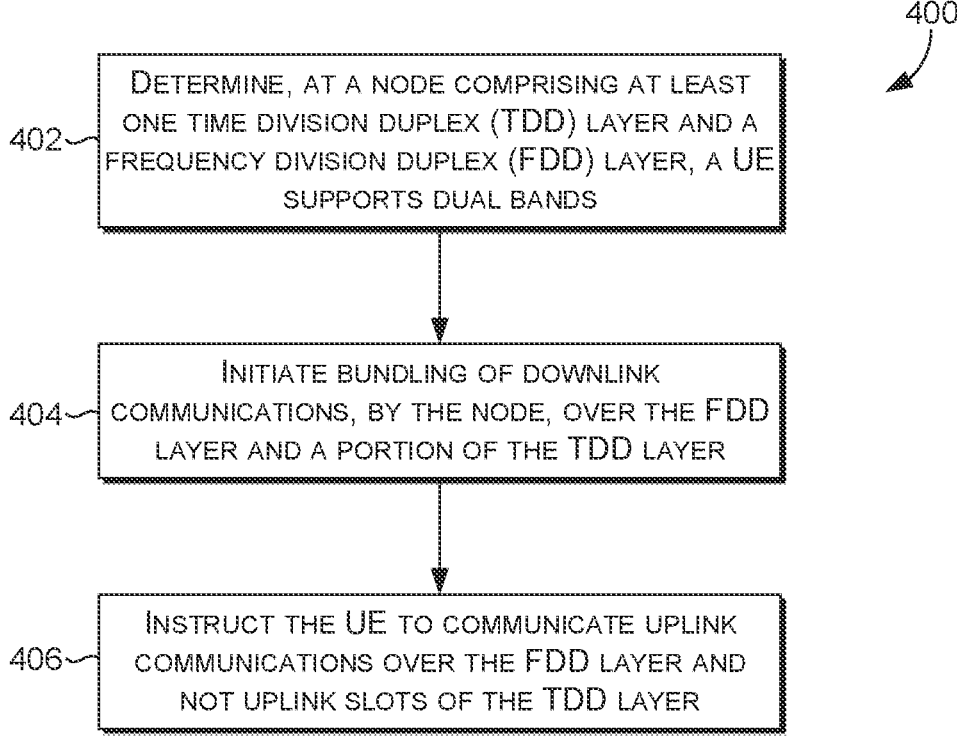
FIG. 4 is a flow diagram of an example method for providing uplink/downlink channel bundling in mobile cellular satellite systems, in accordance with some aspects of the technology described herein.

In FIG. 4, a flow diagram is provided depicting a method 400 for uplink/downlink channel bundling in mobile cellular satellite systems, in accordance with aspects of the present invention. Method 600 may be performed by any computing device (such as computing device described with respect to FIG. 6) with access to a downlink bundling engine (such as the one described with respect to FIG. 1) or by one or more components of the network environment described with respect to FIG. 1 (such as UE 102, access point 114, or downlink bundling engine 130).

Initially, at step 402, it is determined, at a node comprising at least one TDD layer and a FDD layer, a UE supports dual bands (i.e., a TDD layer and an FDD layer). In aspects, the node comprises a LEO mobile cellular satellite system. The node may comprise at least one TDD layer and a FDD layer. In some aspects, the FDD layer is 600, 700, or 850 MHz. In some aspects, the FDD layers is 1900 MHz. In some aspects, the TDD layer is 2500 MHz.

At step 404, the node initiates bundling of downlink communications over the FDD layer and a portion of the TDD layer. In some aspects, the node communicates downlink communications to the UE over the FDD layer and the portion of the TDD layer (i.e., the downlink slots of the TDD layer).

At step 406, the node instructs the UE to communicate uplink communications over the FDD layer and not uplink slots of the TDD layer. In aspects, the node receives the uplink communications from the UE over the FDD layer and not the TDD layer.

Figure 5:
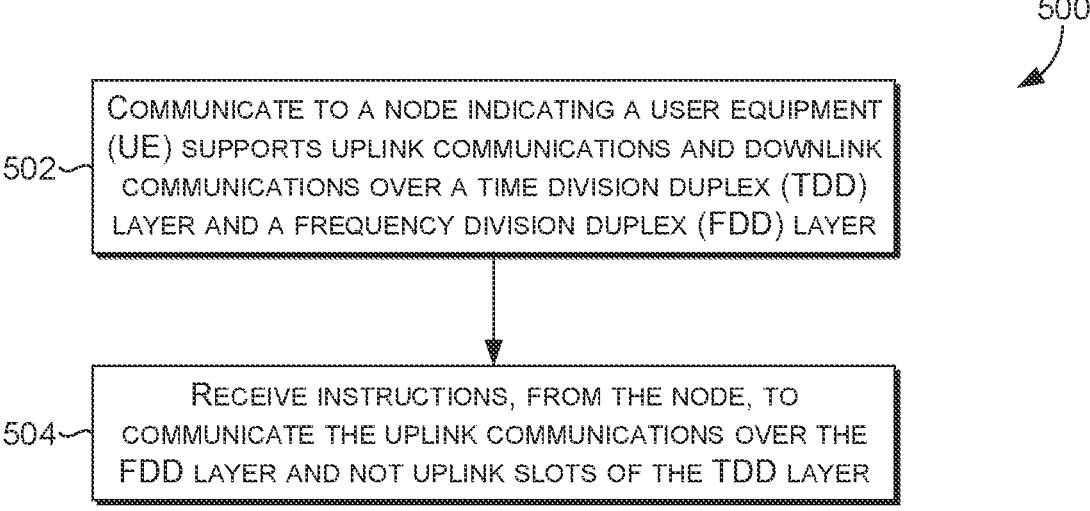
FIG. 5 is a flow diagram of an example method for providing uplink/downlink channel bundling in mobile cellular satellite systems, in accordance with some aspects of the technology described herein.

Referring to FIG. 5, a flow diagram is provided depicting a method 500 for providing uplink/downlink channel bundling in mobile cellular satellite systems, in accordance with aspects of the present invention. Method 500 may be performed by any computing device (such as computing device described with respect to FIG. 6) with access to a downlink bundling engine (such as the one described with respect to FIG. 1) or by one or more components of the network environment described with respect to FIG. 1 (such as UE 102, access point 114, or downlink bundling engine 130).

Initially, at step 502, a UE communicates to a node indicating the UE supports uplink communications and downlink communications over a TDD layer and a FDD layer. In aspects, the node comprises a LEO mobile cellular satellite system. The node may comprise at least one TDD layer and a FDD layer. In some aspects, the FDD layer is 600, 700, or 850 MHz. In some aspects, the FDD layers is 1900 MHz. In some aspects, the TDD layer is 2500 MHz.

At step 504, the UE receives instructions from the node to communicate the uplink communications over the FDD layer and not uplink slots of the TDD layer. Accordingly, in some aspects, the UE communicates, to the node, the uplink communications over the FDD layer and not the TDD layer. In some aspects, the UE receives the downlink communications, from the node, over the FDD layer and a portion of the TDD layer (i.e., the downlink slots of the TDD layer).

FIG. 6 depicts a diagram of an exemplary network environment in which implementations of the present disclosure may be employed. In FIG. 6, computing device 600 includes bus 602 that directly or indirectly couples the following devices: memory 604, one or more processors 606, one or more presentation components 608, input/output (I/O) ports 612, I/O components 610, radio 616, transmitter 618, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 610. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604 or I/O components 610. One or more presentation components 608 present data indications to a person or other device. Exemplary one or more presentation components 608 include a display device, speaker, printing component, vibrating component, etc. I/O ports 612 allow computing device 600 to be logically coupled to other devices including I/O components 610, some of which may be built into computing device 600. Illustrative I/O components 610 include a microphone, joystick, game pad, satellite dish, scanner, printer, wireless device, etc.

The radio 616 represents one or more radios that facilitate communication with a wireless telecommunications network. While a single radio 616 is shown in FIG. 6, it is contemplated that there may be more than one radio 616 coupled to the bus 602. In aspects, the radio 616 utilizes a transmitter 618 to communicate with the wireless telecommunications network. It is expressly conceived that a computing device with more than one radio 616 could facilitate communication with the wireless telecommunications network via both the first transmitter 618 and an additional transmitters (e.g. a second transmitter). Illustrative wireless telecommunications technologies include CDMA, GPRS, TDMA, GSM, and the like. The radio 616 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for providing uplink/downlink channel bundling in mobile cellular satellite systems, the method comprising:

determining, at a node comprising at least one time division duplex (TDD) layer and a frequency division duplex (FDD) layer, a user equipment (UE) supports dual bands;

initiating bundling of downlink communications, by the node, over the FDD layer and a portion of the TDD layer, wherein the downlink communications are bundled over the FDD layer and downlink slots of the TDD layer, and wherein additional bandwidth is provided in downlink communications as the FDD layer is bundled with the downlink slots of the TDD layer; and instructing, by the node, the UE to communicate uplink communications over the FDD layer and not uplink slots of the TDD layer.

2. The method of claim 1, further comprising communicating, by the node, downlink communications to the UE over the FDD layer and the portion of the TDD layer.

3. The method of claim 1, further comprising receiving, at the node, the uplink communications over the FDD layer and not the TDD layer.

4. The method of claim 1, wherein the FDD layer is 600, 700, or 850 MHz.

5. The method of claim 1, wherein the FDD layer is 1900 MHZ.

6. The method of claim 1, wherein the TDD layer is 2500 MHz.

7. The method of claim 1, wherein the node is a low earth orbit mobile cellular satellite system.

8. One or more computer-readable media having computer-executable instructions embodied thereon that, when executed by at least one computing device, cause the computing device to perform operations for providing uplink/downlink channel bundling in mobile cellular satellite systems, the operations comprising:

communicating to a node indicating a user equipment (UE) supports uplink communications and downlink communications over a time division duplex (TDD) layer and a frequency division duplex (FDD) layer;

receiving the downlink communications, from the node, over the FDD layer and a portion of the TDD layer, wherein the downlink communications are bundled over the FDD layer and downlink slots of the TDD layer, and wherein additional bandwidth is provided in downlink communications as the FDD layer is bundled with the downlink slots of the TDD layer; and receiving instructions, from the node, to communicate the uplink communications over the FDD layer and not uplink slots of the TDD layer.

9. The one or more computer-readable media of claim 8, further comprising communicating, to the node, the uplink communications over the FDD layer and not the TDD layer.

10. The one or more computer-readable media of claim 8, further comprising determining the node comprises at least one TDD layer and a FDD layer.

11. The one or more computer-readable media of claim 8, wherein the FDD layer is 600, 700, or 850 MHz.

12. The one or more computer-readable media of claim 8, wherein the FDD layer is 1900 MHz.

13. The one or more computer-readable media of claim 8, the TDD layer is 2500 MHz.

14. The one or more computer-readable media of claim 8, wherein the node is a low earth orbit mobile cellular satellite system.

15. A system for providing uplink/downlink channel bundling in mobile cellular satellite systems, the system comprising:

user equipment (UE); and
   a node comprising at least one time division duplex (TDD) layer and a frequency division duplex (FDD) layer and configured to wirelessly communicate with the UE, wherein the node is configured to:
   determine, a user equipment (UE) supports uplink communications and downlink communications over the TDD layer and the FDD layer;
   initiate bundling of the downlink communications over the FDD layer and a portion of the TDD layer, wherein the downlink communications are bundled over the FDD layer and downlink slots of the TDD layer, and wherein additional bandwidth is provided in downlink communications as the FDD layer is bundled with the downlink slots of the TDD layer; and instruct the UE to communicate uplink communications over the FDD layer and not uplink slots of the TDD layer.

16. The system of claim 15, wherein the node is further configured to communicate the downlink communications to the UE over the FDD layer and the portion of the TDD layer.

17. The method of claim 15, wherein the node is further configured to receive the uplink communications over the FDD layer and not the TDD layer.

18. The system of claim 15, wherein the FDD layer is 600, 700, or 850 MHz or 1900 MHz and the TDD layer is 2500 MHz.

19. The system of claim 15, wherein the node is a low earth orbit mobile cellular satellite system.

* * * * *